(12) United States Patent
Curt et al.

(10) Patent No.: US 8,897,656 B2
(45) Date of Patent: Nov. 25, 2014

(54) SYNCHRONIZING PHASES OF MULTIPLE OPITCAL CHANNELS

(75) Inventors: Petersen F. Curt, Bear, DE (US); Michael R. Bodnar, Newark, DE (US)

(73) Assignee: EM Photonics, Inc., Newark, DE (US)

( * ) Notice: Subject to any disclaimer, the term of this patent is extended or adjusted under 35 U.S.C. 154(b) by 390 days.

(21) Appl. No.: 13/177,989

(22) Filed: Jul. 7, 2011

(65) Prior Publication Data
US 2012/0014699 A1    Jan. 19, 2012

Related U.S. Application Data

(60) Provisional application No. 61/362,469, filed on Jul. 8, 2010.

(51) Int. Cl.
| | |
|---|---|
| H04B 10/06 | (2006.01) |
| H04B 10/08 | (2006.01) |
| H04B 10/12 | (2006.01) |
| H04B 10/079 | (2013.01) |
| H04B 10/2507 | (2013.01) |

(52) U.S. Cl.
CPC .......... H04B 10/079 (2013.01); H04B 10/2507 (2013.01)
USPC ........... 398/209; 398/188; 398/198; 398/208; 398/202; 398/205

(58) Field of Classification Search
USPC .................. 398/208–209, 188–198
See application file for complete search history.

(56) References Cited

U.S. PATENT DOCUMENTS

| | | | | |
|---|---|---|---|---|
| 5,329,253 | A * | 7/1994 | Ichihara | 331/17 |
| 6,493,125 | B1 * | 12/2002 | Tanaka et al. | 398/95 |
| 2003/0123121 | A1 * | 7/2003 | Ohhira | 359/238 |
| 2005/0157969 | A1 * | 7/2005 | Imajuku et al. | 385/1 |
| 2006/0092994 | A1 * | 5/2006 | Frankel et al. | 372/18 |
| 2006/0214825 | A1 * | 9/2006 | Kanazashi | 341/51 |
| 2006/0246865 | A1 * | 11/2006 | Makarov | 455/295 |

FOREIGN PATENT DOCUMENTS

WO    WO 2009132398 A1 *  11/2009

* cited by examiner

*Primary Examiner* — Oommen Jacob
(74) *Attorney, Agent, or Firm* — Panitch Schwarze Belisario & Nadel LLP

(57) ABSTRACT

A system may include one or more devices that may be used to simultaneously measure and modulate phases of a many-channel optical system relative to a high frequency optical carrier. This device may be constructed using analog-to-digital converters, comparators, and distributed timers. A digital processor may be used to recover phase information from the measurements and to calculate an error compared to desired phase. The processor may then apply feedback to a phase modulator to correct the phase.

30 Claims, 7 Drawing Sheets

SYNCHRONIZING PHASES OF MULTIPLE OPITCAL CHANNELS

CROSS-REFERENCE TO RELATED APPLICATION

This application claims priority to U.S. Provisional Patent Application No. 61/362,469, filed on Jul. 8, 2010, and incorporated by reference herein.

FIELD OF THE INVENTION

Various embodiments of the invention may relate to the measurement and/or synchronization of the phases of single frequency optical carriers using analog and/or digital circuits and signal processing.

BACKGROUND OF THE INVENTION

In the capture of imagery using a distributed array of RF antennas, physics generally dictates that the aperture of a sensor must be very large in order to capture imagery with high resolution. Typical solutions to this problem use very large antennas or a steering system to synthetically create a larger aperture. However, it has been shown that sparsely populating an aperture with distributed antennae provides a sensor of acceptable resolution, but requiring significantly reduced size, weight, and power (SWaP). Optoelectronic devices may be used to modulate the captured RF information onto optical carriers. At the receiver, the signals may be combined, and imagery can be reconstructed, e.g., using an infrared camera.

Optical fibers used as data transmission media are typically sensitive to environmental effects, especially vibration. Additionally, the performance of supporting components, such as elements in front-end sensor arrays, may be affected by temperature and humidity. All of these effects can cause the phases of the transmitted signals to drift between channels. In order to focus the array and also compensate for detrimental environmental effects, it may be desirable to synchronize the relative phases of the channels such that they are coherent. Such a system may use a device to measure the phase of each channel and may provide feedback to the system to compensate for the various sources of error.

An interference technique has been used for down-sampling the phases of very high frequency optical carriers in order to focus optically up-converted RF signals in a distributed aperture imager. Off-the-shelf industrial control boards use one ADC per channel to sample an analog waveform, obtaining instantaneous voltage measurements with high quantization and sampling period. Such a phase synchronization solution may use 15 Rack Units (RU) of equipment to synchronize a limited number of optical channels.

When there are hundreds or thousands of elements in the sensor array, the task of phase synchronization becomes even more complex. Using classical techniques to sample the resulting interference patterns with full precision requires an exorbitant amount of bandwidth and electronic components. Further, supporting electronics that use typical analog-to-digital conversion/digital-to-analog conversion (ADC/DAC) industrial control techniques are too large and heavy to be reasonably deployed in a portable system. It may be desirable to overcome these problems, which may allow for field deployment of a system with many more elements and thus better performance than would be otherwise possible.

BRIEF SUMMARY OF EMBODIMENTS OF THE INVENTION

Various embodiments of the invention may address techniques for synchronization of multiple optical signals. Such techniques may utilize hardware, software, and/or firmware components or may be embodied in the forms of methods. Such techniques may involve the use of comparators and/or distributed timers.

BRIEF DESCRIPTION OF THE DRAWINGS

Various embodiments of the invention will now be further described in conjunctions with the accompanying drawings, in which.

DETAILED DESCRIPTION OF EMBODIMENTS OF THE INVENTION

Figure 1:
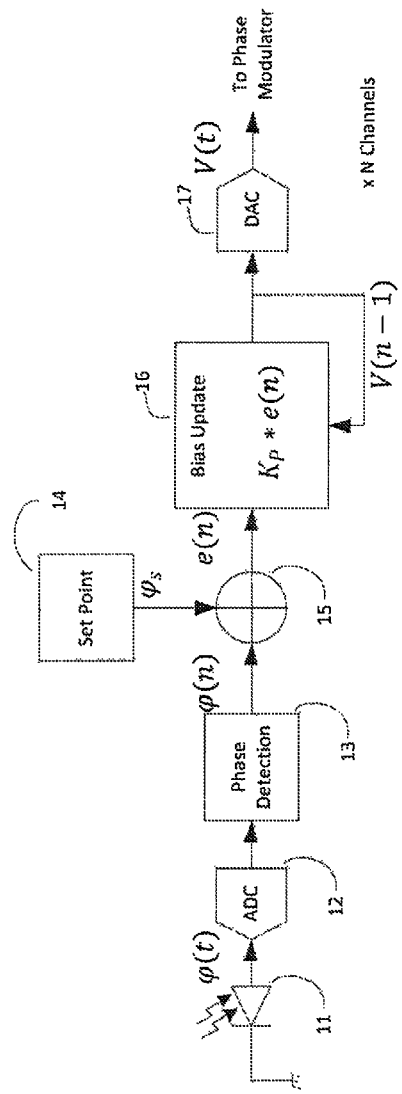
FIG. 1 illustrates a high-level conceptualization of the many-channel optical control system, according to an embodiment of the invention.

Embodiments of the present invention may be directed to techniques and/or apparatus for synchronizing the phases of many optical channels, which may use digital comparators and/or distributed timers. As discussed above, a previously-existing interference technique, for example, may be used for measuring the phases of very high frequency optical carriers in order to focus optically up-converted RF signals in a distributed aperture imager. Extending this idea, embodiments of the present invention may be used to provide the capability for measuring and locking these phases.

The above-mentioned interference technique may generate relatively low-frequency sinusoids and these may be converted to a digital representation using minimal resources. Modern high-speed integrated circuits can sample these digital signals very quickly, effectively oversampling the sinusoid, e.g., by a factor on the order of thousands. Embodiments of the present invention may leverage these facts to measure an optical carrier's phase using only a single integrated circuit package pin and a fraction of its overall computing resources along with a few supporting components. This may result in improved scalability compared to current solutions.

Embodiments of the invention may provide a more efficient technique for synchronizing the phases of many optical carriers using digital comparators with a distributed timer. An embodiment of this invention may use a comparator to detect zero-crossing events by comparing a sinusoid waveform to its average value using a low-pass filter. Other embodiments of this invention may use an amplifier to decouple the input impedance from the comparator input. Other embodiments of this invention may use an amplifier in an open-loop configuration instead of a comparator. Other embodiments of the invention may pre-filter the signal before the comparator. Other embodiments of this invention may use an AC coupling device to remove the DC offset. Other embodiments of this invention may use circuitry to compare to a minimum, maximum, or arbitrarily chosen trigger level in the sinusoid. Other embodiments of this invention may use a higher-order ADC to trade fewer samples for more quantization bits.

Embodiments of the invention may calculate phase errors and compensation values within a digital processing device such as an FPGA (field-programmable gate array). It is yet another object of this invention that compensation is calculated from phase error using a constant which is determined in real-time using a calibration routine performed by the digital processor. The feedback compensation may be relayed back to the transmitter digitally. Other embodiments of this invention may relay feedback compensation back to the transmitter using an analog signal by including an intermediate output stage containing a digital-to-analog converter. Other embodiments of this invention may also contain an amplifier in the output stage for driving a capacitive load. Other embodiments of this invention may include slew limiting or dampening circuitry with that amplifier for stability while driving a capacitive load. Other embodiments of this invention may use a pulse-width modulation (PWM) technique instead of a DAC.

In some embodiments of the invention, a high-speed timer or counter may be used to measure the phase of a single channel. Such measurements may be taken by monitoring the state of the timer, which may be synchronized to an external source, in relation to the above-mentioned zero-crossing events and recording the timer value in response to such an event. Embodiments of this invention may use multiple, distributed timers; the timers may be synchronized to one another with auxiliary or similar means. Such synchronization may be accomplished by the use of a common reset signal, for example, but is not limited thereto. Embodiments of this invention may share a single timer among a subset of the channels.

Other embodiments of this invention may use other digital processor(s) besides an FPGA, including, but not limited to, a complex programmable logic device (CPLD), digital signal processor (DSP), application-specific integrated circuit (ASIC), microprocessor, or microcontroller. Other embodiments of this invention may use multiple or a combination of these logic devices working in concert. Other embodiments of this invention may include some or all of the input stage circuitry within the digital processor component responsible for computing the phase and compensation. Other embodiments of this invention may include some or all of the output stage circuitry within the digital processor component responsible for computing the compensation.

In various embodiments of the invention, the digital processor responsible for computing the compensation may be programmed such that each channel's phase may be locked to a particular value. Furthermore, in some embodiments, one or more phase sets, or profiles, may be stored in the digital processor's memory. In some further embodiments, the phase profiles stored may be reprogrammed in real-time.

In some embodiments of the invention, a periodic sawtooth signal may be created using an external parallel digital-to-analog converter and amplifier output stage. Other embodiments of this invention may use a serial digital-to-analog converter. Other embodiments of this invention may use an external arbitrary waveform generator. Other embodiments of this invention may include a portion or all of these circuits within the digital processor device.

In various embodiments of the invention, the digital processor device may continuously update the output DAC state using a programmed set of sample values to generate a sawtooth of particular amplitude and frequency. These values may be pre-computed and stored in a lookup table. In some embodiments of the invention, the lookup table can be reconfigured in real-time to generate a sawtooth of different amplitude or frequency. In further embodiments, new sawtooth amplitude and frequency parameters may be calculated based on calibration routine(s) executed by the digital processor.

A system according to an embodiment of the invention may include a device for simultaneously measuring and modulating phases of a many-channel optical system relative to a high frequency optical carrier. This system may be constructed using analog-to-digital converters, comparators, and/or distributed timers.

Figure 7:
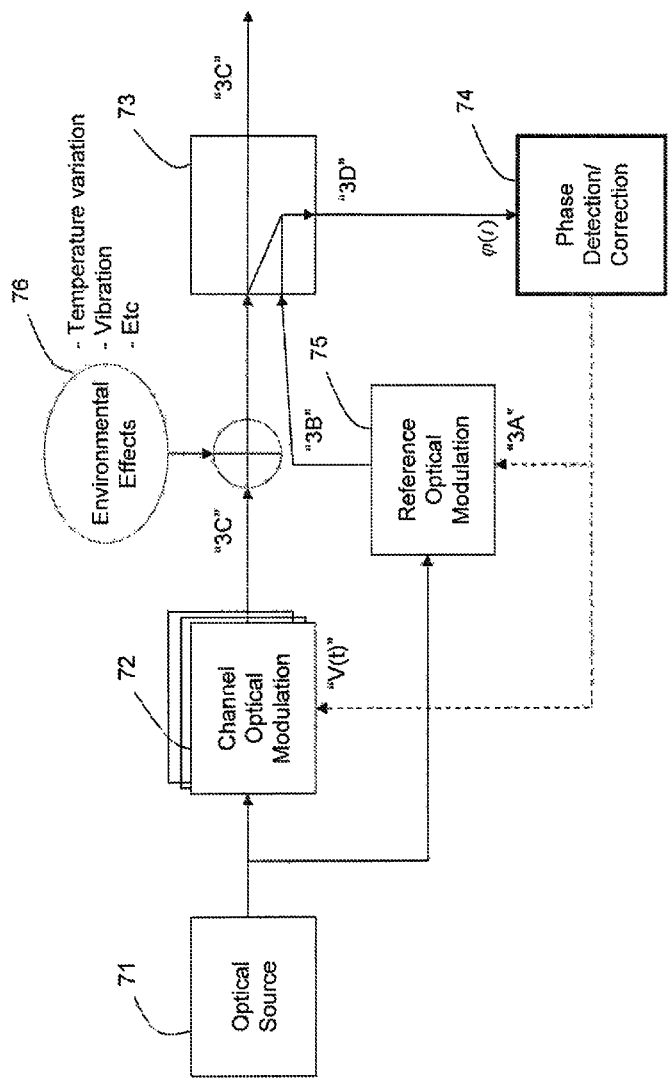
FIG. 7 illustrates an exemplary system according to an embodiment of the invention.

An exemplary system in which this may be performed, according to an embodiment of the invention, is shown in FIG. 7. One or more optical carriers may be generated by an optical source 71. The one or more optical carriers may, for example, be fed to optical modulators 72. In an exemplary embodiment, phase modulation may be used in optical modulator 72. The result may be forwarded to a splitter/combiner 73, where one portion may be used for phase monitoring and/or correction, while the other portion may be forwarded for further processing, as desired. The portion that may be used for phase monitoring and/or correction may combined with a common reference modulator 75, and the interfered result may be fed to a phase detection/correction block 74. This block may be implemented, for example, using all or portions of an apparatus to be described further. As noted with respect to the above discussion, such apparatus, although shown in FIG. 7 as a single block (and in FIG. 1 as a single apparatus) may comprise multiple apparatus for multiple channels, and/or some portions may be shared among different channels. As further shown in FIG. 7, feedback signals may be provided to optical source 71 and/or to optical modulation 72 to control and/or correct one or more phases of the one or more optical signals.

FIG. 1 shows an exemplary implementation of an embodiment of the invention for a single channel (and it is noted that this may be repeated for some number, N, of channels). A single interference pattern generated based on combining a particular channel and a reference may be detected using photodetector 11. The output of photodetector 11 may be fed to ADC 12 for sampling, to produce digitized samples of the signal. A processor 13, which may be implemented as a digital processor, may then be used to obtain the value of timer 18, which may be synchronized via auxiliary means, to recover phase information from the measurements. The phase detection output, $\phi(n)$, may then be compared 15 (which may be, e.g., an adder or subtractor) to a desired phase ("set point"), $\phi_s$, which may be stored and/or computed in block 14. This may result in an error value, e(n). The error may then be input to a bias update block 16, which may compute a bias value based on the error value (e.g., by multiplying it by a constant, $K_p$, and may add or subtract it from/to the previous feedback value to obtain an updated feedback. The resulting feedback may then be fed to a DAC 18 to produce an output value, V(t). This output value may then be fed back to an optical signal generator and/or phase modulator of the channel, to correct the phase. Without compensation, the relative phases of channels may drift continuously over time. As long as a single reference modulator block 75 is shared among all channels in the system, the described apparatus can synchronize each channel to the reference, and furthermore, each channel to every other channel. While FIG. 1 shows this in the form of a hardware block diagram, it is noted that all or portions of the process implemented in FIG. 1 may be implemented in software (which may comprise executable instructions, and which may be stored in some memory or other storage medium) that may be executed by one or more processing devices. Similarly, all or portions of this may be implemented using other types of processing devices, such as, but not limited to, FPGAs, CPLDs, ASICs, etc.

As noted above, there may be multiple versions of the system of FIG. 1 to accommodate multiple channels. Two or more signals can be synchronized by adapting the processing to lock each phase to a particular value. Multichannel processing may use multiple timers and/or counters to measure phase, which timers and/or counters may be distributed throughout the processor. Such counters may be synchronized from a single control source. In order to detect multiple channels, one or more elements of a sensor array may replace photodiode 11 in FIG. 1. This sensor may be a focal plane array (FPA); however, the invention is not thus limited. Using these techniques, among others, closed-loop synchronization of many channels may be possible in real-time using a fraction of the size, weight and power (SWaP) other systems require. This may be useful, e.g., in a distributed aperture imager using optical up-conversion.

Figure 2:
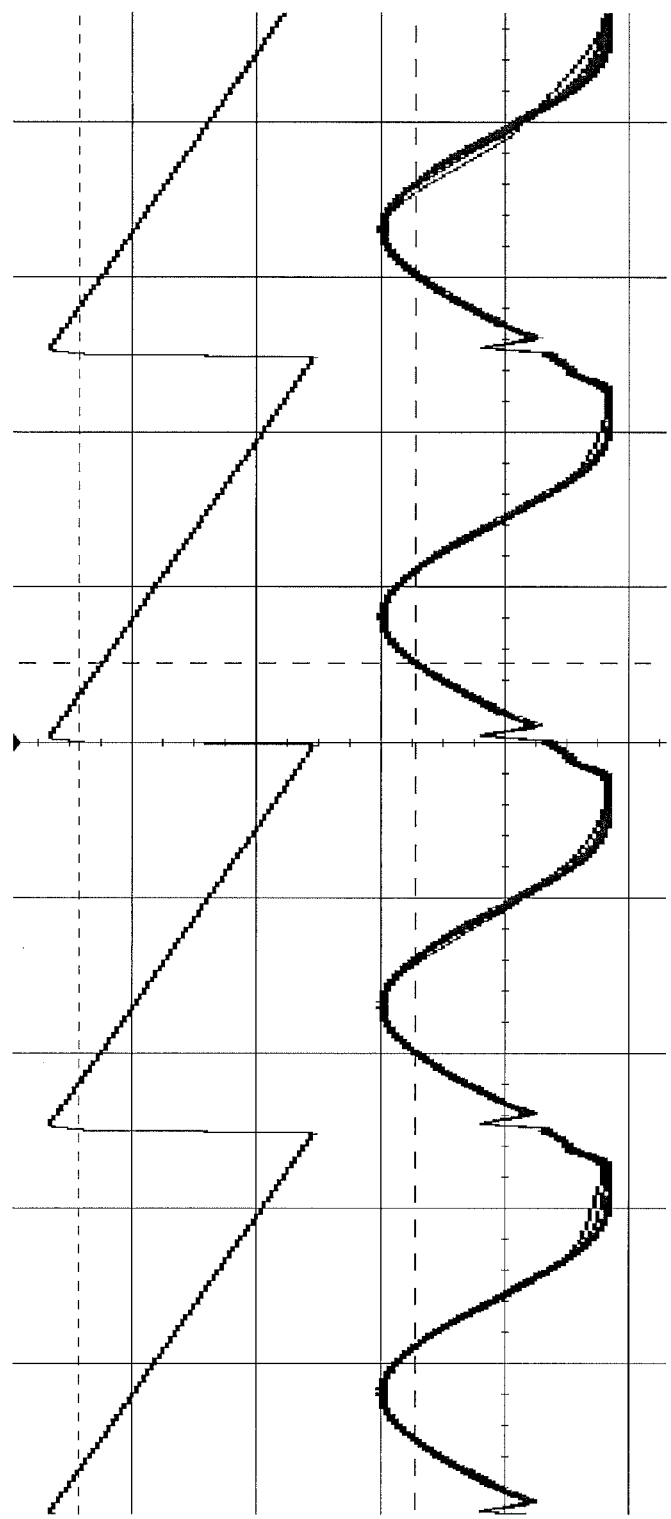
FIG. 2 illustrates a waveform that appears as a right triangle or "sawtooth" when plotting time vs. phase.
Figure 3:
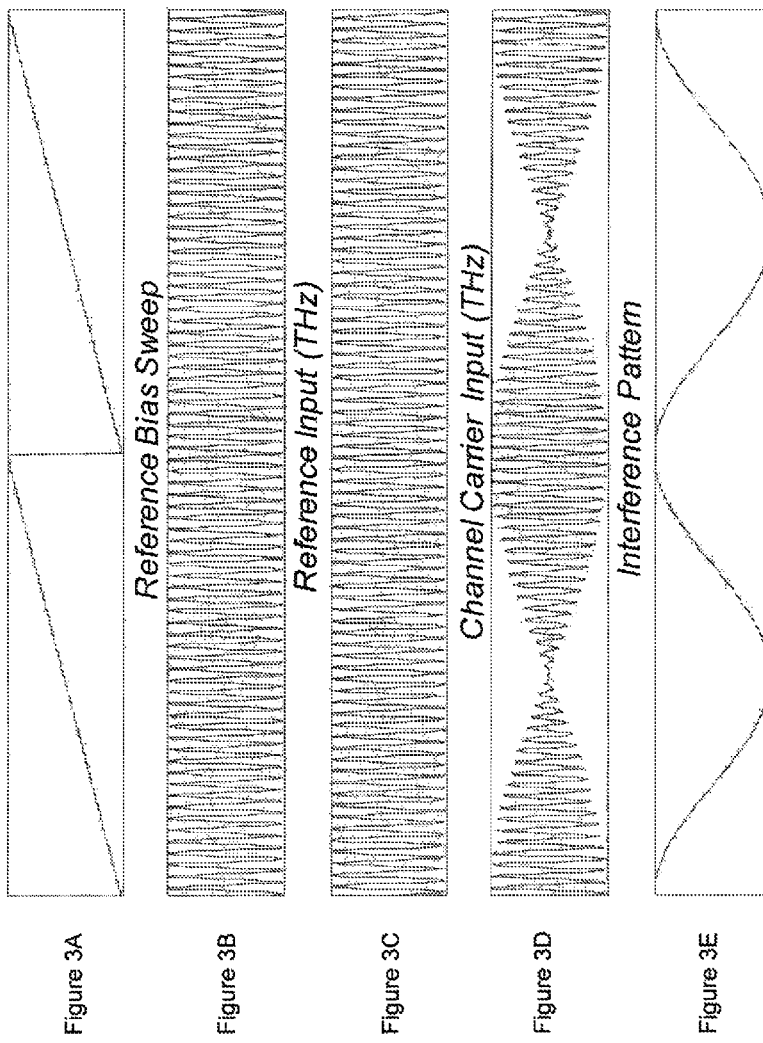
FIGS. 3A-3E illustrate how a low frequency sinusoid may be synthesized through interference.

In the above-mentioned interference technique, the carrier signals of the information channels are combined with a single common modulated reference (e.g., as in FIG. 7, Block 75), which has the same frequency as the information channels, but which has a phase which varies linearly in time. During a "reference period," the phase of the reference signal is swept a full $2\pi$ radians. Plotting time against phase, this waveform appears as a right triangle, or a canonical "sawtooth" pattern. See FIG. 2 (top waveform) and FIG. 3A. The resulting phase modulated carrier (FIG. 3B) may appear as a high-frequency sinusoid with slower varying phase expressed in FIG. 3A. The channel carrier input may appear similarly as another sinusoid of the same frequency. These two signals, the reference (as in FIG. 3B) and the channel (as in FIG. 3C) may be combined to form an interference pattern (as in FIG. 3D). If the phase of the information channel's carrier to be measured is constant during the reference optical modulator's phase bias sweep period, the detected interference pattern generated from the information and reference channel may appear as a sinusoid. The frequency of the sinusoid may be the same frequency as the sawtooth pattern applied to the reference. When the two signals are completely in phase, constructive interference may result in maximum detected intensity (e.g., FIG. 3D, maximum amplitude). When the two signals are completely out of phase, the inference is destructive, and the intensity is smallest (e.g., FIG. 3D, minimum amplitude). Finally, when detected by a bandwidth-limited detector (for example, a photodetector), the detected interference pattern may appear as a sinusoid (see, e.g., FIG. 2 (bottom waveform) or FIG. 3E) with the same frequency as the original reference phase sweep (FIG. 3A).

Figure 4:
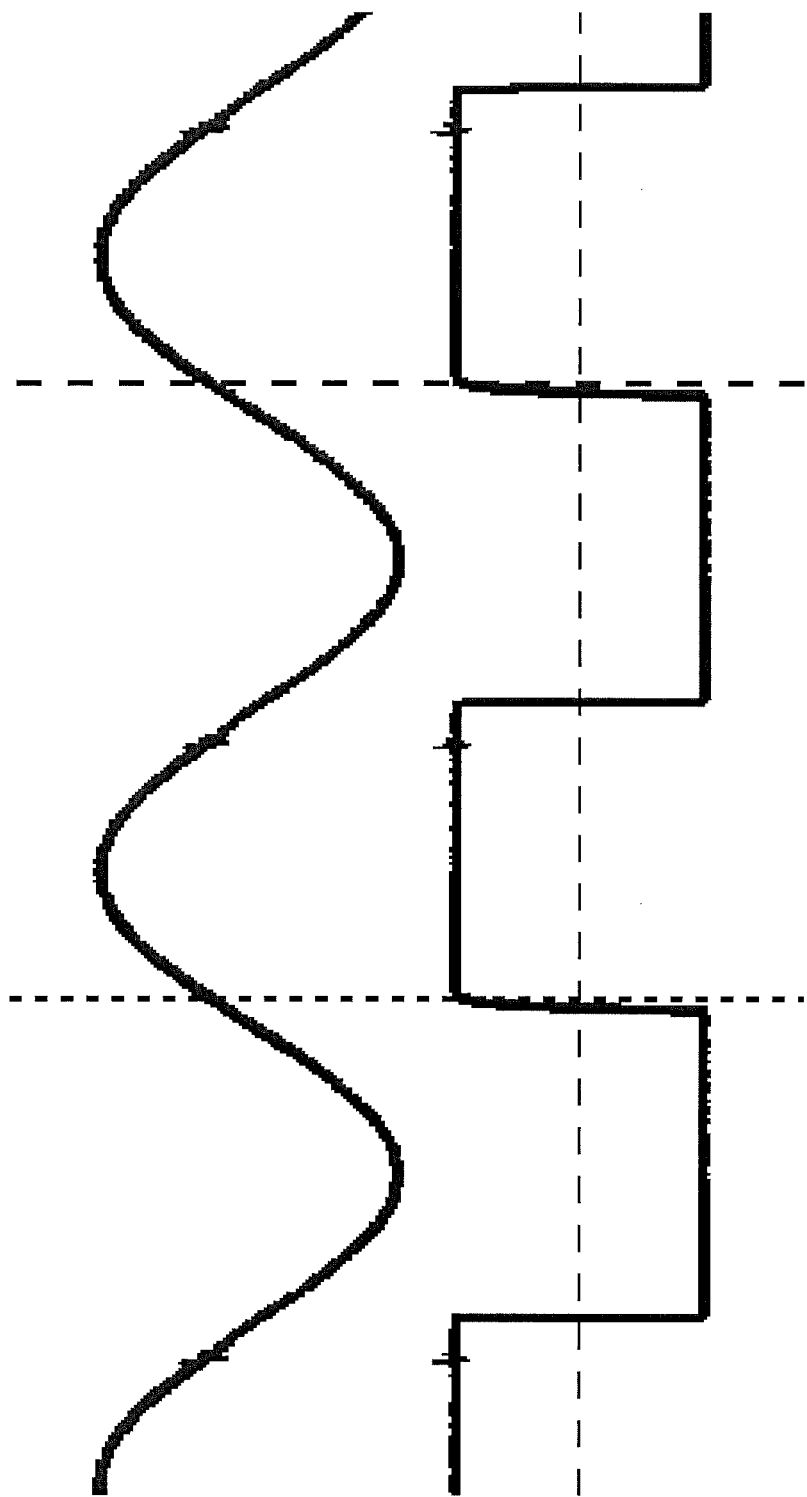
FIG. 4 illustrates the plotted waveform after the analog to digital conversion according to an embodiment of the invention.

An embodiment of the invention may take advantage of the fact that phase can be measured by counting the delay between the start of a reference sawtooth sweep and observed inflection points in the sinusoid (i.e., "zero crossings"). When applying the sawtooth to the interfered reference, exactly two zero crossings may be observed at the detected output. The first may occur at the inflection point between the signal's maximum and minimum, and the second may occur between the signal's minimum and maximum again. A single-bit digital-to-analog conversion scheme may be used to transform the sinusoid into a digital square wave of the same frequency, which may then be monitored (sampled) for the zero crossing events. See FIG. 4.

While FIG. 1 shows the elements corresponding to this particular embodiment of the invention in the form of photodiode 11 and ADC 12, this embodiment can be implemented through many different circuit topologies, including but not limited to the following exemplary circuitry.

Figure 5:
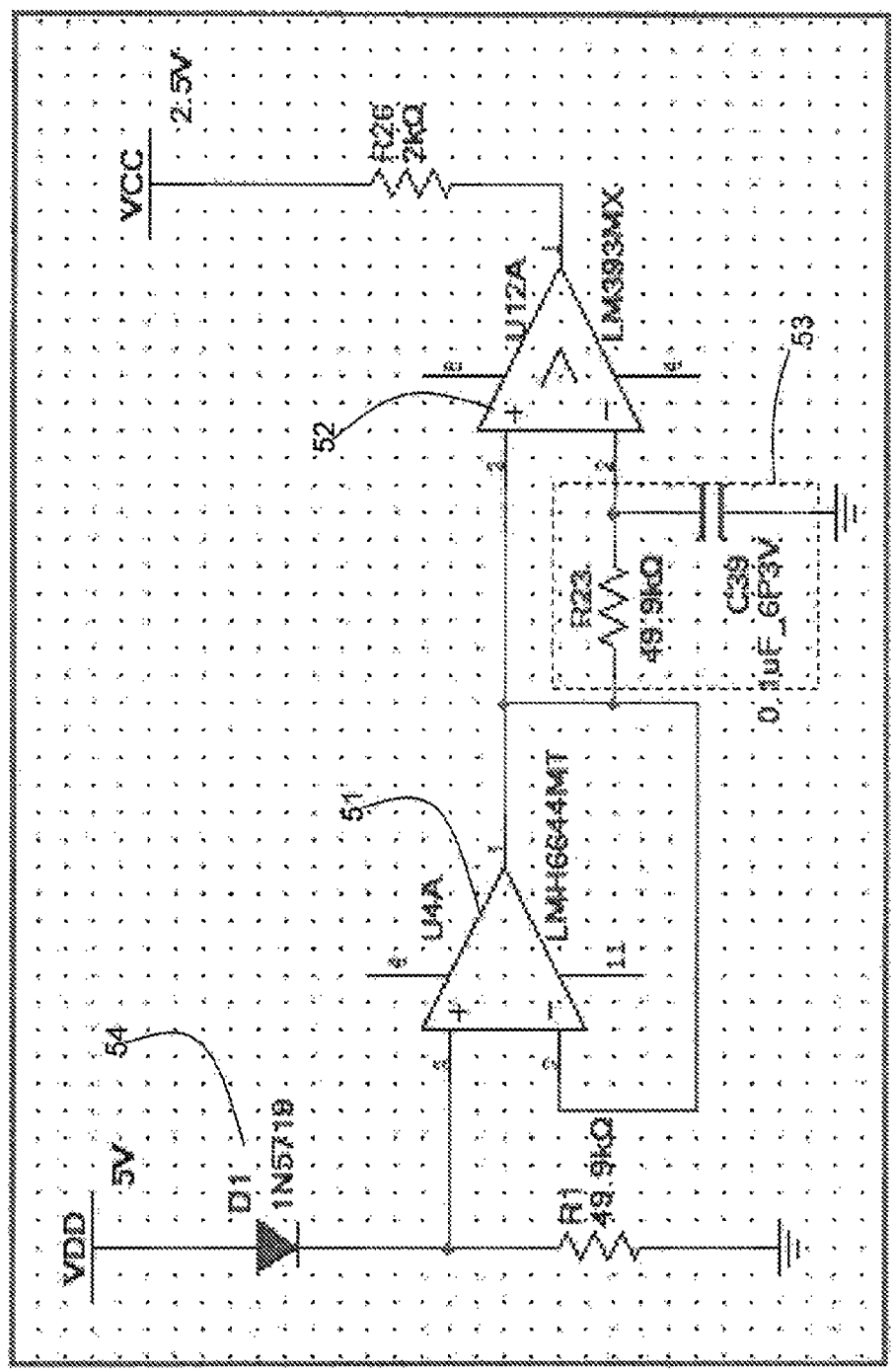
FIG. 5 illustrates an example single-bit analog-to-digital conversion scheme of an embodiment of the invention.

FIG. 5 shows a digital comparator 52 with open-loop feedback, which may provide one example of an implementation of such embodiments of the invention. The output of comparator 52 is designed to swing to the high supply rail when the V+ pin is larger than the V−. When the reference is "false" (i.e., the negative input is greater than the positive input), the output will swing to the low supply rail. Using such a device, one can connect the sine wave input signal to one comparator input and an isolated low-pass filtered version of the sinusoid to the other input. The low-pass filtered version may track the average value of the signal and may be obtained from the sinusoid, e.g., using a low-pass filter (LPF), such as, but not limited to, LPF 53. When the sinusoid "crosses" its average value at its inflection point, the comparator 52 may then create an edge. The low-pass circuit 53 may be tuned such that it minimizes high frequency noise on the input while not adding too much phase delay at the particular reference sawtooth of interest. It is noted, however, that it is possible to compensate for a small deterministic phase delay in post-processing. As shown in FIG. 5, an amplifier 51 may be used to buffer the input observed by the photodetector 54 (shown as a photodiode but not limited thereto).

Other circuit topologies, in other implementations of such embodiments, could AC couple inputs and compare to ground, reverse the connections between V+ and V−, or low-pass filter to ground. Further, additional circuit topologies may time multiplex detection by sharing some or all of the comparator, input buffer, low-pass filter among multiple channels. Each of these embodiments may have associated trade-offs between minimization of SWaP and performance.

Furthermore, in various embodiments, any appropriate sampling device can be used to detect the phase of the sinusoid. Besides using a comparator, which is effectively a 1-bit ADC, other embodiments of this invention may use higher order ADCs available in integrated circuit packages or constructed using discrete components. If an ADC is used, higher-order techniques, such as cubic or spline interpolation, may be used to approximate the phase with sub-sample accuracy.

Figure 6:
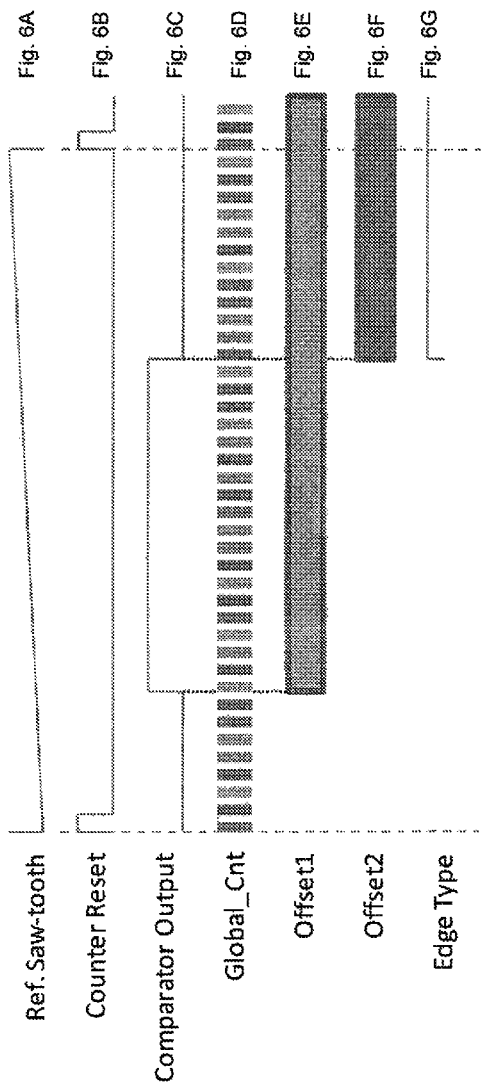
FIGS. 6A-6G illustrate how phase may be recovered based on measurement using the distributed timer approach, according to an embodiment of the invention.

In an embodiment of the invention, a digital processor (e.g. FPGA, CPLD, ASIC, microcontroller, microprocessor) may be used to measure the delay of the comparator output edges. The processor may program a waveform generator to create a periodic sawtooth pattern, e.g., as shown in FIG. 6A, as a reference (such a waveform may also be generated by other means, such as by digital synthesis, including the case of reading digital waveform values out of a memory and converting the digital values into analog signals, and this may be done under the control of the processor). The processor function that creates this periodic signal may initialize a phase monitoring function at the beginning of each sawtooth sweep. The monitoring function may employ a counting scheme to measure the duration between initialization and events generated on the single-bit analog-to-digital converter output via a single input pin. The processor may, for example, generate a counter reset signal, such as is shown in FIG. 6B, at the beginning of a period of the sawtooth sweep. This may initialize a counting function, which may be implemented in a counter, for example, and which may be shown in FIG. 6D.

Detected phase resolution is a function of monitor program frequency, typically operating much faster than the reference sawtooth period (as reflected in the counting function of FIG. 6D, for example). When the phase counter logic recognizes a comparator edge (as shown in the comparator output of FIG. 6C), it may save the state of the count as well as the type of edge (rising or falling; this is reflected in FIG. 6G). When the phase counter logic recognizes a second comparator edge, it may again save the state of the count. Using the measured edge type and two count values, the relative phase of the signal can be measured.

An embodiment of this invention may use a digital processor to provide feedback compensation to a device in order to synchronize the phase(s) of many channel(s). The digital processor may decode information captured by the phase counters, calculate the feedback required to shift the phase to a desired value, and provide a feedback signal. The feedback may be applied as an analog voltage. Other embodiments may apply this feedback as an analog current or digitally. The following paragraph describes how one embodiment of the invention may calculate phase and required feedback for synchronization.

The following description and equations refer to two values "Offset1" and "Offset2," which refer to the state of the timer registered at the times of two zero crossing detection; these may be, for example, as shown in FIGS. 6E and 6F. Offset1 may be multiplied by the ratio of the reference sweep frequency to the phase counter frequency and may be multiplied by $2\pi$ to obtain the phase, in radians. See Equation 1 below. If the first detected event was a falling edge, one may subtract it from this value. See Equation 2 below. Embodiments of this invention may use a duty-cycle correction term to compensate for asymmetric digital comparator rise and fall times, or phase delay in the low-pass filter. A perfect measurement would result in a 50% duty cycle. If the difference between Offset2 and Offset1 is not half the ratio of the phase counter to the reference sawtooth, the duty cycle may be incorrect. Half of this error may then be added to or subtracted from the calculated phase to compensate. See Equation 3 below.

$$\varphi_a = \text{Offset1} \times \frac{f_{sawtooth}}{f_{g\_log\_al\_cni}} \times 2\pi \quad \text{Equation 1}$$

$$\varphi_b = \{EdgeType == rising\}?\varphi_a : \varphi_a - \pi \quad \text{Equation 2}$$

$$\varphi_c = \varphi_b \pm \frac{(\text{Offset2} - \text{Offset1}) - \frac{f_{global\_cni}}{2 f_{sawtooth}}}{2} \quad \text{Equation 3}$$

The processor, as reflected in Block 15 of FIG. 1, may then compare the calculated phase, $\phi_e$, to the desired phase, $\phi_{set}$, and may calculate the phase compensation required to adjust, as reflected in Block 16 of FIG. 1. This compensation calculation may use a calibrated constant $$K_p = \frac{V_\pi}{\varphi_\pi},$$

where $V_\pi$ represents the voltage that may be applied to the optical modulator to shift the carrier by one-half cycle ($\pi$ radians), and $\phi_\pi$ may represent the number of phase counter samples per reference period. $\phi_\pi$ may be calculated based on the phase counting frequency divided by the reference sawtooth frequency. $V_\pi$ may depend on the physical characteristics of the particular channels' optical modulator and may be measured during a calibration period, e.g., at startup. The change in compensation voltage that may be applied in order to shift the current phase to the desired set value may be obtained by multiplying the phase error by the $K_p$ constant. See Equation 4 below. The processor may then update the compensation voltage, $V_{comp} = V_{comp} - \Delta V_{comp}$, and may program an external DAC (e.g., Block 17 of FIG. 1) to produce the updated $V_{comp}$ voltage (shown as V(t) in FIG. 1). See Equation 5 below.

$$\Delta V_{comp} = K_p \times (\phi_{set} - \phi_c) \quad \text{Equation 4}$$

$$V_{comp} = V_{comp} - \Delta V_{comp} \quad \text{Equation 5}$$

The overall process of detecting the phase, calculating the error, and applying compensation creates a closed feedback loop that may be updated frequently, across many channels. When successfully implemented, these techniques may be used to lock the phases of many carriers in real-time, in the presence of vibration and other environmental effects, for example, in order to electronically focus a distributed aperture imager using RF optical up-conversion. A single digital processor, such as a state-of-the-art FPGA, can easily manage the control of hundreds of these channels, and the supporting analog circuitry can be implemented on a custom printed circuit board using minimal area.

The foregoing description of the invention illustrates and describes embodiments of the present invention. It is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form or application disclosed herein.

What is claimed is:

1. A phase control apparatus, comprising:
    at least one phase detector configured to detect a respective phase component of at least one optical signal;
    at least one comparison device configured to compare the detected respective phase component with a corresponding phase set-point value to generate an error value; and
    at least one phase correction generation device configured to generate at least one phase correction signal corresponding to the at least one optical signal and based at least in part on the error value, wherein the at least one phase correction signal is used to adjust at least one phase of the at least one optical signal.

2. The apparatus of claim 1, wherein the corresponding phase set-point is common to a plurality of optical signals.

3. The apparatus of claim 1, wherein the phase correction generation device is configured to multiply the error value by a bias value, and wherein the phase correction generation device is further configured to update the bias value based on feedback of at least one previous phase correction signal.

4. The apparatus of claim 1, further comprising at least one analog-to-digital converter configured to digitize an output of the at least one detector.

5. The apparatus of claim 4, further comprising at least one detector configured to detect the at least one optical signal and to provide at least one input to the at least one phase detector, wherein the at least one detector comprises at least one device selected from the group consisting of a focal plane array, a charge-coupled device, and a detector array.

6. The apparatus of claim 1, further comprising at least one digital-to-analog converter configured to convert an output of the at least one phase correction generation device to an analog signal.

7. The apparatus of claim 1, further comprising at least one optical modulation device, wherein the at least one phase correction signal is arranged to be fed back to at least one optical phase modulation device.

8. The apparatus of claim 7, wherein the at least one optical modulation device comprises at least one channel optical modulation device or at least one reference optical modulation device.

9. The apparatus of claim 1, wherein the at least one optical signal comprises at least one modulated optical carrier signal interfered with at least one optical reference signal.

10. The apparatus of claim 1, further comprising a set-point computation device configured to compute one or more phase values for use by the at least ne comparison device.

11. The apparatus of claim 1, wherein the at least one phase detector is configured to detect the respective phase component by generating a periodic sawtooth reference waveform, detecting points of inflection of the at least one optical signal and their times of occurrence relative to the sawtooth reference waveform, and computing the respective phase component based on the relative times of occurrence of the points of inflection.

12. The apparatus of claim 11, wherein the at least one phase detector comprises an analog-to-digital converter or a comparator and low-pass filter circuit, and wherein the analog-to-digital converter or the comparator and low-pass filter circuit is configured to detect the points of inflection.

13. The apparatus of claim 11, an amplifier configured to buffer at least one output signal from the at least one phase detector.

14. The apparatus of claim 11, wherein one or more of the at least one phase detector is configured to be shared to enable detection on multiple optical channels.

15. The apparatus of claim 11, wherein the relative times of the occurrence of the points or inflection are measured using at least one tinier or counter.

16. The apparatus of claim 15, wherein multiple timers and/or counters are used, and wherein the multiple timers and/or counters are synchronized by a common reset signal.

17. A phase control method comprising:
  detecting a respective phase component of at least one optical signal;
  comparing the detected respective phase component with a corresponding phase set-point value to generate an error value;
  generating at least one phase correction signal corresponding to the at least one optical signal and based at least in part on the error value; and
  using the at least one phase correction signal to adjust at least one phase of the at least one optical signal.

18. The method of claim 17, wherein the corresponding phase set-point is common to a plurality of optical signals.

19. The method of claim 17, wherein generating at least one phase correction signal comprises:
  multiplying the error value by a bias value; and
  updating the bias value based on feedback of at least one previous phase correction signal.

20. The method of claim 17, wherein the at least one optical signal includes at least one optically modulated component produced by at least one optical phase modulation device, and wherein the method further comprises feeding back the at least one phase correction signal to the at least one optical phase modulation device.

21. The method of claim 17, wherein the at least one optical signal comprises at least one modulated optical carrier signal interfered with at least one optical reference signal.

22. The method of claim 17, further comprising computing one or more phase set-point values for use in said comparing.

23. The method of claim 17, wherein said detecting the respective phase component comprises:
  generating a periodic sawtooth reference waveform;
  detecting points of inflection of the at least one optical signal and their times of occurrence relative to the sawtooth reference waveform; and
  computing the respective Phase component based on the relative times of occurrence of the points of inflection.

24. A storage medium containing executable instructions that, upon execution by a processing device, result in the implementation of operations comprising:
  detecting a respective phase component of at least one input optical signal;
  comparing the detected respective phase component with a corresponding, phase set-point value to generate an error value;
  generating at least one phase correction signal corresponding to the at least one optical signal and based at least in part on the error value; and
  using the at least one phase correction signal to adjust at least one phase of the at least one optical signal.

25. The medium of claim 24, wherein the corresponding phase set-point is common to a plurality of optical signals.

26. The medium of claim 24, wherein generating at one phase correction signal comprises:
  multiplying the error value by a bias value; and
  updating the bias based on feedback of at least one previous correction signal.

27. The medium of claim 24, wherein the at least one input optical signal includes at least one optically modulated component produced by at least one optical phase modulation device, and wherein the operations further comprise providing the at least one phase correction signal the at least one optical phase modulation device.

28. The medium of claim 24, wherein the at least one input optical signal comprises at least one modulated optical carrier signal interfered with at least one optical reference signal.

29. The medium of claim 24, wherein the operations further comprise computing one or more phase set-point values for use in said comparing.

30. The medium of claim 24, wherein said detecting the respective phase component comprises:
  generating a periodic sawtooth reference waveform;
  detecting points of inflection of the at least one optical signal and their times of occurrence relative to the sawtooth reference waveform; and
  computing the respective phase component based on the relative times of occurrence of the points of inflection.

* * * * *